United States Patent [19]  
Chabot et al.

[11] 4,159,140  
[45] Jun. 26, 1979

[54] SELF-DEPLOYABLE AIR SPOILER ASSEMBLY

[75] Inventors: James V. Chabot, Birmingham; Charles Haddad, West Bloomfield; Robert W. Huzzard, Livonia, all of Mich.

[73] Assignee: Ford Motor Company, Dearborn, Mich.

[21] Appl. No.: 889,685

[22] Filed: Mar. 24, 1978

[51] Int. Cl.² ............................................. B62D 37/00
[52] U.S. Cl. ..................................... 296/1 S; 105/2 A
[58] Field of Search ................... 296/1 S, 91; 105/2 A

[56] References Cited

U.S. PATENT DOCUMENTS

| 3,618,998 | 11/1971 | Swauger | 296/1 S |
| 3,869,617 | 3/1975 | Gaussoin | 296/1 S |

FOREIGN PATENT DOCUMENTS 2159636  12/1971  Fed. Rep. of Germany ........... 296/1 S Primary Examiner—Philip Goodman  
Attorney, Agent, or Firm—John J. Roethel; Keith L. Zerschling

[57] ABSTRACT

A self-deployable front air spoiler assembly mounted beneath a vehicle underbody, the air spoiler assembly comprising a laterally extending airfoil which in non-deployed condition is situated in a semi-concealed position. The airfoil is supported at each side of the longitudinal center of the vehicle on swingable links, each link being pivotally coupled at one end to the airfoil and at the other end to the vehicle underbody. The pivot axes of the links are substantially parallel to the airfoil. Biasing means interposed between the air spoiler assembly and the vehicle underbody normally biases the airfoil toward its deployed condition. As the air pressure against the front face of the airfoil increases as the speed of the vehicle is increased, the airfoil swings downwardly increasing the frontal area impacted by the airstream and restricting the flow of air beneath the vehicle underbody.

6 Claims, 4 Drawing Figures

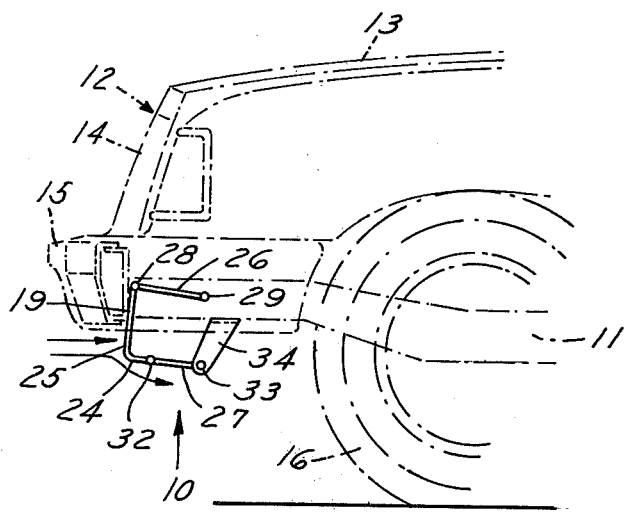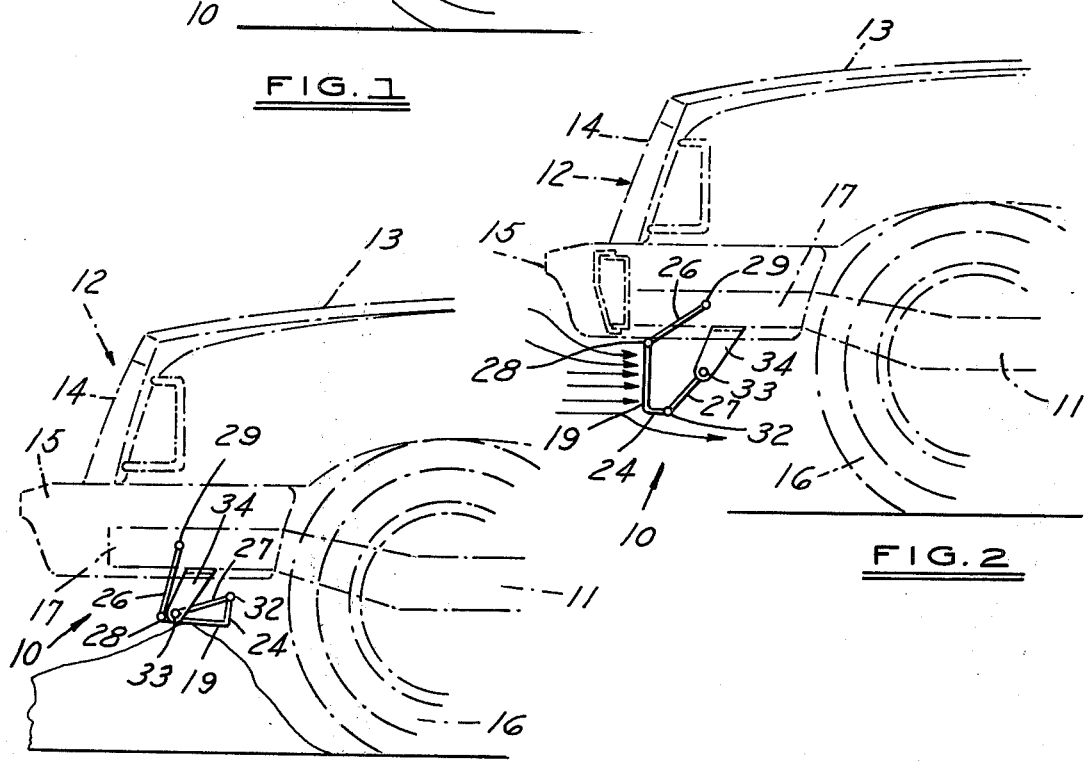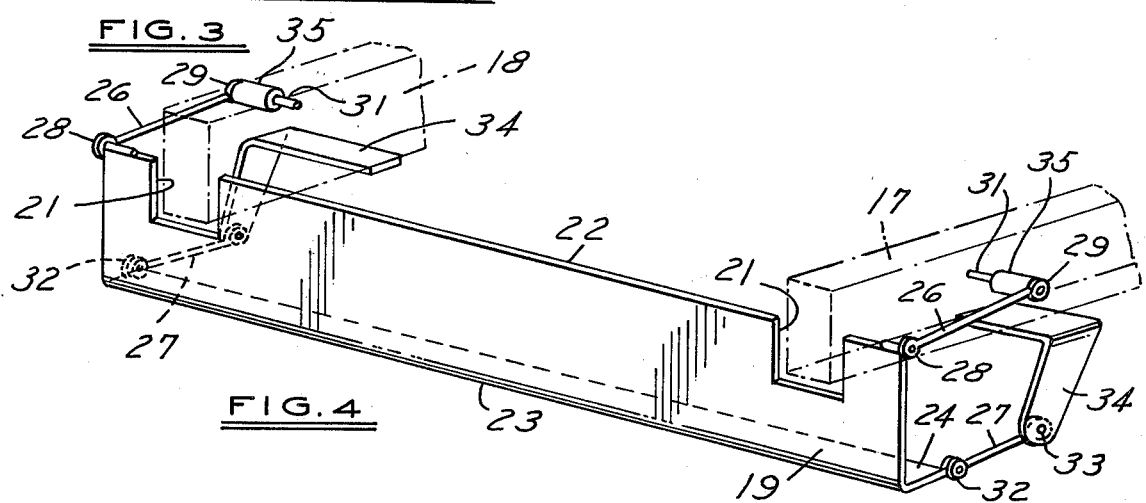

SELF-DEPLOYABLE AIR SPOILER ASSEMBLY

BACKGROUND OF THE INVENTION

U.S. Pat. No. 2,036,560 issued Apr. 7, 1936 to W. T. Backus for "Land Vehicle Equipment" documents an early attempt to improve the streamlining of moving vehicles by reducing the airflow under the vehicle. The patentee pointed out that the undersurface of a vehicle "is the source of even more loss of efficiency than results from unimproved upper surfaces of the same vehicle" for two reasons. "First, numerous projections on the bottoms of vehicles increase the amount of wind resistance; and, second, the air pressure which is built up underneath the moving car in the restricted space between the bottom surface of the vehicle and the ground increase the amount of drag or retardation from wind resistance." The patentee's solution was to provide a hydraulically adjustable airfoil at the front of the vehicle that had a non-convex upper surface to direct air up and over the vehicle.

Subsequently, it was determined that an airfoil or a spoiler mounted beneath the front end of the vehicle also would be advantageous to reduce drag. The January 1970 issue of Motor Trend Magazine, at page 40, shows a vehicle having a fixed spoiler mounted beneath the streamlined nose of the vehicle. The caption accompanying the picture states, "Spoiler not only kills front end lift, but lowers overall drag by limiting airflow under the car and also aids engine cooling." Such fixed spoilers have been used on many racing cars and high powered sport model versions of passenger cars.

U.S. Pat. No. 3,618,998 issued Nov. 9, 1971 to D. A. Swauger for "Wind Load Applicator and Stabilizer for Steerable Front Wheels of Rear-Engine Vehicles" carried the concept of a front end stabilizer or spoiler mounted beneath the vehicle a step further. The Swauger patent discloses an airfoil member pivotally mounted adjacent and relative to a flat pan bottom of a well known type of vehicle. A spring-loaded means supports the airfoil member in a normally raised position. The spring-loaded means is yieldable, however, under increased air pressure as the vehicle velocity increases, to permit increased downward inclination of the airfoil and, therefore, greater downward pressure of the tires of the vehicle upon the pavement.

It is an object of the present invention to provide a spoiler that is self-deployable in response to increased speed of the vehicle. The spoiler is substantially concealed beneath the front end structure of the vehicle at no or low speed, but is adapted to self-deploy when the vehicle reaches a critical speed at which such a device becomes effective or beneficial.

SUMMARY OF THE INVENTION

The present invention relates to a self-deployable air spoiler assembly adapted to be mounted beneath the front end of a vehicle underbody. The air spoiler assembly comprises an airfoil extending across the vehicle that is concealed when in nondeployed condition behind the front end structure of the vehicle in a substantially upright position with a lower portion extending beneath the level of the front end structure. The airfoil is supported adjacent each of its lateral ends on upper and lower spaced links. The links are each pivotally connected at one end to the airfoil and at the other end to the underbody of the vehicle. The links are swingable about pivot axes substantially paralleling the airfoil. The airfoil is normally biased toward its nondeployed position by a biasing means acting between the underbody of the vehicle and the air spoiler assembly.

The air spoiler assembly is movable on the links downwardly relative to the vehicle underbody against the biasing force of the biasing means in response to increased air pressure acting against the exposed portion of the airfoil as the speed of the vehicle exceeds a predetermined velocity thus increasing the frontal area of the airfoil exposed to the airstream. The result is a restriction of airflow beneath the vehicle.

DESCRIPTION OF THE DRAWINGS

Other objects, advantages and features of the present invention will be made more apparent as this description proceeds, particularly when considered in connection with the accompanying drawing, wherein:

FIG. 1 is a semi-diagrammatic side elevation of an air spoiler assembly embodying the present invention, the air spoiler assembly being shown mounted beneath the front end of a vehicle in nondeployed condition;

FIG. 2 is a view in part similar to FIG. 1 showing the air spoiler assembly in deployed condition;

FIG. 3 is a view in part similar to FIG. 1 showing the air spoiler assembly in a folded condition as might be caused by engagement with an obstruction in a roadway; and FIG. 4 is an enlarged perspective view of the air spoiler assembly illustrating more fully the basic structural details.

DETAILED DESCRIPTION OF THE INVENTION

Referring now to the drawings, there is shown an air spoiler assembly, generally designated 10, mounted beneath the underbody 11 of the front end 12 of a vehicle. For the purpose of establishing the setting in which the air spoiler assembly 10 is adapted to be used, the front end 12 of the vehicle is shown in dot-and-dash outline as including a hood 13, a front grille 14, a front bumper assembly 15, and front wheel 16. The front bumper assembly 15 is mounted on the front end of the vehicle front stub frame represented by the frame members 17 and 18.

The air spoiler assembly 10 comprises a laterally extending elongated airfoil 19. As best seen in FIG. 4, airfoil 19 preferably extends laterally outwardly of the vehicle frame members 17 and 18. The airfoil 19 is formed of sheet metal or plastic. It is provided with vertically depending slots 21 extending downwardly from the upper edge 22, the slots permitting the airfoil in nondeployed position to partially straddle each of the vehicle stub frame members 17 and 18. At its lower edge 23, the airfoil 19 has a substantially right angle flange 24 that primarily provides structural rigidity. In nondeployed condition, FIG. 1, the airfoil 19 is substantially concealed behind the front bumper assembly 15 with a lower marginal portion 25 extending beneath the lower level of the latter.

The airfoil 19 is supported adjacent each of its lateral ends on an upper link 26 and a lower link 27. The front end of upper link 26 is pivotally connected at 28 to the upper outer corner of the airfoil 19. The rear end of each upper link is pivotally connected at 29 to a pivot stud or shaft 31 anchored to a stub frame member 17 or 18, respectively.

The front end of each lower link 27 is pivotally connected at 32 to an outer corner of the airfoil flange 24.

The rear end of each link 27 is pivotally connected at 33 to the lower end of a depending bracket 34 mounted on the underside of a stub frame member 17 or 18, respectively. The several pivot axes defined by the pivots 28—28, 29—29, 32—32 and 33—33 are all substantially parallel to the airfoil 19.

The air deflector assembly 10 is in effect a four-bar linkage system having as a fixed link the portion of the stub frame 17 or 18 and bracket 34 extending between pivots 29-33, two swingable links 26 and 27, and a connecting link which is the airfoil 19.

The airfoil 19 is normally maintained in the nondeployed position of FIG. 1 when the vehicle is at rest or travelling at low speed by a biasing means. The biasing means is shown as a torsion member 35 in the form of a rubber bushing surrounding each pivot stud or shaft 31. Each torsion member 35 is anchored at one end to the adjacent frame member and at the other end to the adjacent end of a link 26 and resists twisting movement about its longitudinal axes. It will be understood that a coiled spring could be used in place of each torsion member 35 made of rubber.

The air spoiler assembly 10 moves downwardly relative to the bumper assembly 15 and the vehicle underbody 11 against the biasing force of the resilient means, torsion member 35, in response to increased air pressure acting on the exposed lower marginal portion 25 of the airfoil 19 upon the speed of the vehicle exceeding a predetermined velocity. As the air spoiler assembly 10 moves downwardly, the frontal area of the airfoil exposed to the airstream increases until the air spoiler assembly is fully deployed as shown in FIG. 2. The airfoil 19, as it moves downwardly and upwardly, maintains a substantially upright position. When fully deployed, the airfoil substantially restricts the flow of air beneath the vehicle underbody.

The four-bar linkage system used in the air spoiler assembly 10 provides a further advantage, see FIG. 3. Should the airfoil 19 hit an obstruction in the roadway, such as a snow bank, dirt pile or the like, the construction and arrangement of the links permits the system to fold up as the airfoil rotates about the pivots 28 from an upright position to a substantially horizontal position. After the obstruction is passed over, the torsion members 35 react to restore the airfoil 19 to its normal upright position.

It is to be understood this invention is not limited to the exact construction illustrated and described above, but that various changes and modifications may be made without departing from the spirit and scope of the invention.

We claim:

1. A self-deployable air spoiler assembly mounted beneath the front end of a vehicle underbody having a bumper assembly extending forwardly thereof,
    the air spoiler assembly comprising an elongated airfoil extending laterally of the vehicle and in non-deployed condition being situated rearwardly of the bumper assembly in a substantially upright position with a lower marginal frontal portion extending beneath the level of the bumper assembly,
    the airfoil being supported adjacent each of its lateral ends on upper and lower spaced links,
    pivot means coupling the ends of each link to the airfoil and to support members on the underbody of the vehicle for swinging movement about pivot axes substantially paralleling the airfoil,
    resilient means comprising torsion means mounted on at least one of the pivot means,
    the torsion means acting between the vehicle underbody and the air spoiler assembly to bias the airfoil toward its nondeployed position,
    the air spoiler assembly being movable downwardly relative to the bumper assembly against the biasing force of the torsion means in response to increased air pressure acting on the exposed portion of the airfoil as the speed of the vehicle exceeds a predetermined velocity thus increasing the frontal area of the airfoil exposed to the airstream and restricting the flow of air beneath the vehicle,
    the torsion means being operative to restore the air spoiler assembly from deployed to nondeployed position upon the air pressure acting on the front face of the airfoil dropping below a predetermined value when the speed of the vehicle is decreased,
    the airfoil in deployed condition normally maintaining its substantially upright position.

2. A deployable spoiler according to claim 1, in which:
    the airfoil upon engaging an obstruction beneath the vehicle is foldable relative to its supporting links from its normal substantially upright position toward a horizonal position substantially paralleling the underbody of the vehicle.

3. A self-deployable air spoiler assembly mounted beneath the front end of a vehicle underbody,
    the air spoiler assembly comprising an airfoil extending across the vehicle that in nondeployed condition is concealed behind the front end structure of the vehicle in a substantially upright position with a lower marginal portion extending beneath the level of the front end structure,
    and a first pair of spaced airfoil support links extending from the upper portion of the airfoil to first support members on the vehicle underbody on opposite sides of and substantially paralleling the longitudinal center of the latter,
    pivot means coupling each of the first pair of links at one of its ends to the airfoil and at the other of its ends to a support member,
    a second pair of airfoil support links extending from a lower portion of the airfoil to second support members on the vehicle underbody positioned below the first support members,
    pivot means coupling each of the second pair of links at one of its ends to the airfoil and at the other of its ends to a second support member,
    biasing means interposed between the vehicle underbody and the air spoiler assembly normally biasing the airfoil into its nondeployed position,
    the airfoil being movable downwardly relative to the vehicle underbody against the biasing force of the biasing means in response to increased air pressure acting against the face of the exposed marginal portion thereof as the speed of the vehicle exceeds a predetermined velocity thus increasing the frontal area of the airfoil exposed to the airstream and restricting the flow of air beneath the vehicle,
    the support links being collapsible to permit the airfoil when in deployed condition to swing from a normal substantially upright position toward a horizontal position beneath the vehicle underbody to minimize damage to the airfoil.

4. A deployable air spoiler assembly according to claim 3, in which:

the support links are swingable about pivot axes paralleling the airfoil.

5. A self-deployable air spoiler assembly mounted beneath the front end of a vehicle underbody, the air spoiler assembly comprising an airfoil extending across the vehicle that in nondeployed condition is concealed behind the front end structure of the vehicle in a substantially upright position with a lower marginal portion extending beneath the level of the front end structure, and a first pair of spaced airfoil support links extending from the upper portion of the airfoil to first support members on the vehicle underbody on opposite sides of and substantially paralleling the longitudinal center of the latter, pivot means coupling each of the first pair of links at one of its ends to the airfoil and at the other of its ends to a support member, a second pair of airfoil support links extending from a lower portion of the airfoil to second support members on the vehicle underbody positioned below the first support members, pivot means coupling each of the second pair of links at one of its ends to the airfoil and at the other of its ends to a second support member, biasing means interposed between the vehicle underbody and the air spoiler assembly normally biasing the airfoil into its nondeployed position, the airfoil being movable downwardly relative to the vehicle underbody against the biasing force of the biasing means in response to increased air pressure acting against the face of the exposed marginal portion thereof as the speed of the vehicle exceeds a predetermined velocity thus increasing the frontal area of the airfoil exposed to the airstream and restricting the flow of air beneath the vehicle, the construction and arrangement of the links and the relationship of the pivot means being such that the airfoil in moving from nondeployed to deployed position and return maintains a substantially upright position.

6. A deployable spoiler according to claim 5, in which:

the airfoil upon engaging an obstruction beneath the vehicle is foldable relative to its supporting links from its normal substantially upright position toward a horizontal position substantially paralleling the underbody of the vehicle.

* * * * *